United States Patent [19]
Matsuura

[11] Patent Number: 4,726,433
[45] Date of Patent: * Feb. 23, 1988

[54] COMBINED WEIGHING APPARATUS

[75] Inventor: Yoshikazu Matsuura, Tokyo, Japan

[73] Assignee: Teraoka Seiko Co., Ltd., Tokyo, Japan

[*] Notice: The portion of the term of this patent subsequent to Aug. 12, 2003 has been disclaimed.

[21] Appl. No.: 876,786

[22] Filed: Jun. 20, 1986

Related U.S. Application Data

[63] Continuation of Ser. No. 643,898, Aug. 23, 1984.

[30] Foreign Application Priority Data

Aug. 31, 1983 [JP] Japan .................................. 58-159478
Aug. 31, 1983 [JP] Japan .................................. 58-159479

[51] Int. Cl.$^4$ ...................... G01G 19/22; G01G 13/00
[52] U.S. Cl. ................................ 177/1; 177/25; 177/65; 177/104
[58] Field of Search ................. 177/1, 25, 50, 65, 103, 177/104

[56] References Cited

U.S. PATENT DOCUMENTS

| | | |
|---|---|---|
| 570,109 | 10/1896 | Smyser . |
| 3,783,957 | 1/1974 | Borghi .................................. 177/54 |
| 4,418,771 | 12/1983 | Henry et al. ........................... 177/1 |
| 4,454,924 | 6/1984 | Minamida ............................. 177/25 |

Primary Examiner—George H. Miller, Jr.
Attorney, Agent, or Firm—Popper, Bobis & Jackson

[57] ABSTRACT

An improved combined weighing apparatus is provided for weighing vegetables and fruits, confectionary articles, secondary products, perishables and other articles having high variations in single weight with high accuracy to produce packages having a predetermined weight. System for measurement of feeded products and for combination of weights which is equal or most approximate to the target value are improved in a way to eliminate the dead time of combining operation during weighing time for increasing the speed of combining operation while maintaining high accuracy.

11 Claims, 17 Drawing Figures

COMBINED WEIGHING APPARATUS

This is a continuation of application Ser. No. 643,898, filed Aug. 23, 1984.

BACKGROUND OF THE INVENTION

1. Field of the Invention

This invention relates to a combined weighing apparatus for weighing vegetables and fruits, confectionary articles, secondary products, perishables and other articles having high variation in single weight with high accuracy to produce packages having a predetermined weight. More particularly, the invention relates to an improvement in the combined weighing apparatus wherein a plurality of weighing hoppers take measurement of fed products and a combination of weights which is equal or most approximate to the target value is selected by computer.

2. Description of the Prior Art

The conventional combined weighing apparatus such as the one disclosed in U.S. Pat. No. 3,939,928, lacks efficiency since the combining operation is stopped during weighing new products after the first combining process has been completed.

Figure 17:
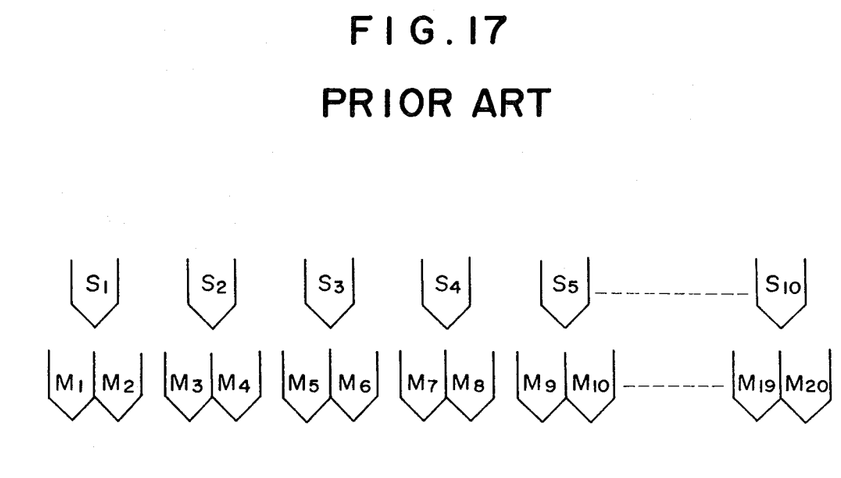
FIG. 17 is a structural view of the conventional apparatus.

Further an apparatus as shown in FIG. 17 has been proposed wherein sets of memory hoppers (M1) ... (M20) for pooling weighed products are provided below weighing hoppers (S1) ... (S10), so as to increase the combining number. Such apparatus also is defective since the combining operation is stopped, that is, dead time is generated, when emptied memory hoppers (M1) (M2) are filled in with products to be weighed and when they measure these products. Further, combining accuracy is decreased in the case when the combining operation is not stopped, since a combination of weights is selected from memory hoppers excluding the emptied hoppers.

SUMMARY OF THE INVENTION

This invention is intended to eliminate the disadvantages of the prior art. It is an object of the invention to provide a combined weighing apparatus which eliminates the dead time of a combining operation during a weighing time so as to increase the speed of the combining operation and which is capable of maintaining high accuracy.

The combined weighing apparatus provided in accordance with the invention comprises a plurality of sets of two weighing hoppers for alternatingly weighing feeded products, and sets of predetermined number of memory hoppers including one memory hopper per set which is capable of receiving weighed products transferred from either of paired weighing hoppers, for pooling the products, and wherein combinations of weights are formed from the group of memory hoppers consisting of one hopper per set, and combinations which are equal or nearest to predetermined weight value are selected from said combinations of weights.

Further, according to the invention, a combined weighing apparatus is provided which comprises a plurality of sets of two weighing hoppers for alternatingly weighing feeded products, and sets for predetermined number of memory hoppers including at least two hoppers per set which are capable of receiving weighed products transferred from either of paired weighing hoppers, and wherein combinations of weights are formed from the group of memory hoppers consisting of one hopper per set, and combinations which are equal or nearest to predetermined weight value are selected from said combination of weights.

The invention will be more fully understood by referring to the following detailed specification and claims taken in connection with the appended drawings.

DESCRIPTION OF THE PREFERRED EMBODIMENTS

In FIGS. 1 through 4 of the drawings which illustrate the first embodiment of the invention, sets of two weighing hoppers (S1, S2), (S3, S4) ... (S11, S12) are provided for weighing fed products to be measured, so that the alternative one in each set weighs the products. Below the measuring hoppers are provided sets of three memory hoppers (M1, M2, M3) ... (M16, M17, M18) in such a manner that the center hopper (M2), (M5) ... (M17) in each set may be fed from any one of weighing hoppers (S1, S2) ... (S11, S12). Products weighed at the weighing hoppers are pooled in the memory hoppers. Sets of three memory hoppers (M1, M2, M3) ... (M16, M17, M18) are so arranged that only one memory hopper per set takes part in combination in one time, and that two or more hoppers for example (M1, M2), (M2, M3) ... will not be combined at the same time.

This is because weighed products will not be transferred simultaneously to two emptied memory hoppers (M1) (M2) for example, since one of two weighing hoppers (S1) (S2) is still in the weighing process though the other contains weighed products.

Then a combination of weight equal to or near to a set weight is selected from any combination of groups of memory hoppers formed from one hopper per set.

The operation process of the combined weighing apparatus is explained with reference to the drawings wherein the circled weighing hoppers are in the weighing mode and the circled memory hoppers are empty.

Figure 1:
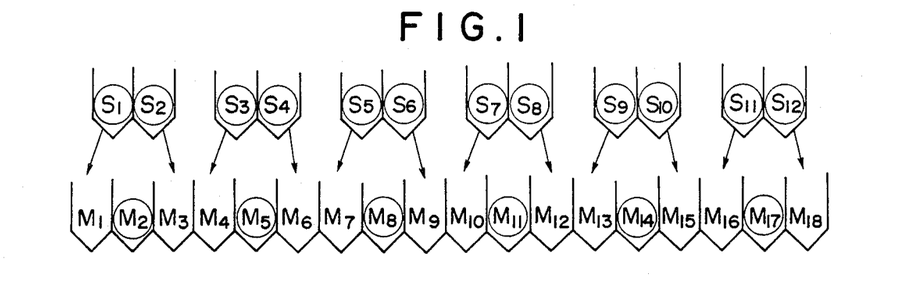
FIG. 1 is a structural view of the first embodiment of a combined weighing apparatus of the invention.

At the first stage, products are fed into all weighing hoppers (S1) ... (S12) and after being weighed, products are transferred into corresponding memory hoppers (M1) (M3) ... (M16) (M18). Then new products are fed weighing hoppers so as to be weighed (FIG. 1).

Figure 2:
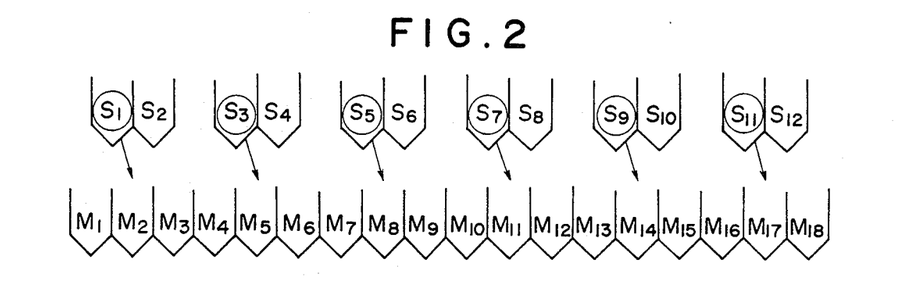
FIGS. 2 through 4, respectively, are explanatory views showing the mode of operation of the first embodiment of FIG. 1.

After being weighed, products in odd-numbered weighing hoppers (S1)... (S11) are transferred into still empty memory hoppers (M2)... (M17). Odd-numbered weighing hoppers are then fed with new products while even-numbered weighing hoppers (S2)... (S12) are pooled with weighed products (FIG. 2).

Figure 3:
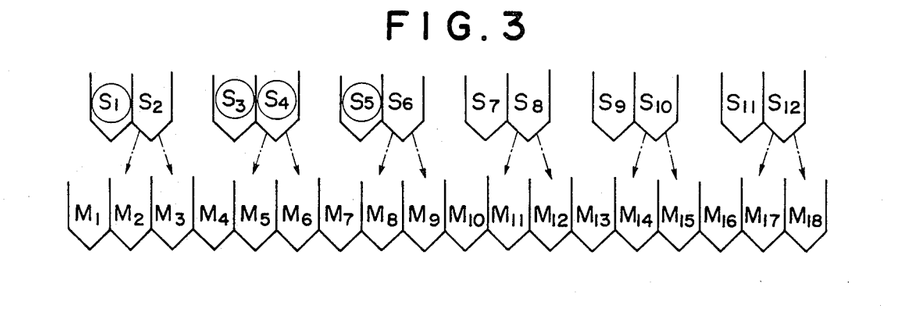

A combination of weight equal to or near the set weight is selected from combinations of a group of one memory hopper per set (FIG. 3). Selected and emptied memory hoppers are filled in with weighed products from even-numbered weighing hoppers which, in turn, are fed with new products.

Figure 4:
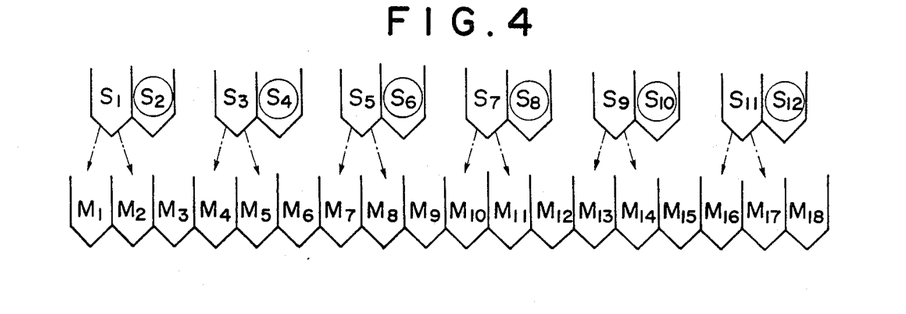

Products in odd-numbered weighing hoppers have been weighed during the combining operation, and products of all or part of even-numbered weighing hoppers (S2)... (S12) are being weighed (FIG. 4). Next selection is effected from a group of one memory hopper from each of memory hopper sets (M1) (M2), (M4) (M5)... (M16) (M17). The procedure above is repeated.

In combined weighing apparatuses, the more the number of hoppers, the higher is the measuring accuracy.

In prior art hopper combination selecting systems, the number of hoppers to be combined was generally 10, and their combination can be calculated as follows:

$$_{10}C_1 + {}_{10}C_2 + {}_{10}C_3 + {}_{10}C_4 + {}_{10}C_5 +$$
$$_{10}C_6 + {}_{10}C_7 + {}_{10}C_8 + {}_{10}C_9 + {}_{10}C_{10}$$
$$= 10 + 45 + 120 + 210 + 252 + 210 + 120 + 45 + 10 + 1$$
$$= 1023$$

The number of hoppers will not exceed 10 normally, because the number of combinations increases enormously and the combining arthmetic time increases accordingly, if one hopper is added. For example, the number of combinations becomes 2047 if 11 combining hoppers is used.

According to the present embodiment, since there are no combinations of hoppers of the same set, 12 weighing hoppers are used so as to increase the number of combinations. The total number of combinations of this embodiment is as follows:

$$_{6}C_1 \times 2^1 + {}_{6}C_2 \times 2^2 + {}_{6}C_3 \times 2^3 +$$
$$_{6}C_4 \times 2^4 + {}_{6}C_5 \times 2^5 + {}_{6}C_6 \times 2^6$$
$$= 12 + 60 + 480 + 240 + 192 + 64 = 1048$$

The apparatus of this embodiment uses two more weighing hoppers in comparison with those of conventional apparatus, which results in improvement in combining accuracy and in efficiency in term of operation speed since weighed products are transferred to the memory hoppers immediately after being emptied without any waiting time. Further, since combinations are always carried out with 12 memory hoppers, a decrease in accuracy will not occur. In the conventional apparatus, if a first combination has been carried out and if 9 memory hoppers remain, the number of combinations will be as follows:

$$_{9}C_1 + {}_{9}C_2 + {}_{9}C_3 + {}_{9}C_4 + {}_{9}C_5 + {}_{9}C_6 + {}_{9}C_7 + {}_{9}C_8 + {}_{9}C_9$$

-continued
$$= 9 + 36 + 84 + 126 + 126 + 84 + 36 + 9 + 1$$
$$= 511$$

Thus, the combining accuracy will be reduced.

Hoppers in this embodiment may be arranged in two parallel rows, or in a circular manner.

The second embodiment of the invention is then explained with reference to FIGS. 5 through 8, wherein weighing hoppers (S1)... (S12) which are similar to those used in the first embodiment, are circularly arranged in a manner that the weighing operation is carried out in alternative order of even- and odd-numbered hoppers.

Memory hoppers (M1)... (M6) are provided between neighboring weighing hoppers (S1, S2)... (S11, S12) and detours (N1)... (N6) are provided between neighboring weighing hoppers (S12, S1)... (S10, S11) so that memory hoppers and detours circularly alternate with each other.

Gates (G1)... (G12) are provided between weighing hoppers (S1)... (S12) so that respective hoppers may feed weighed products to either a memory hopper or detour. For example, the weighing hoppers (S1) can feed products to either the memory hopper (M1) or detour (N1), and the weighing hopper (S2) can feed products to the memory hopper (M1) or detour (N2).

Figure 5:
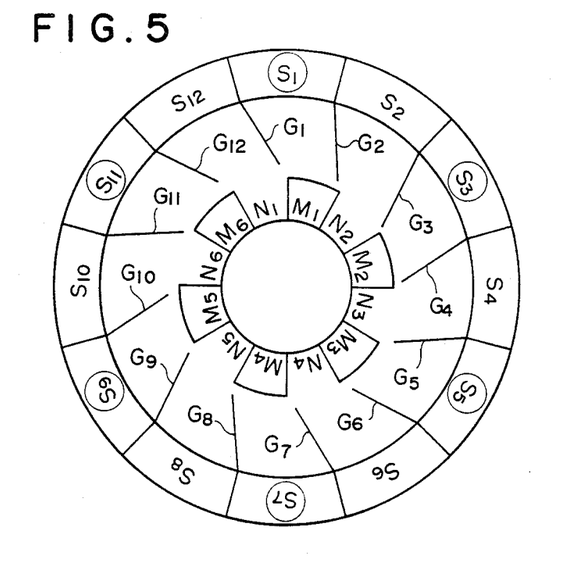
FIG. 5 is a structural view of the second embodiment of the invention.

Memory hoppers in this embodiment correspond to the centered memory hoppers (M2) (M5)... (M17) of the first embodiment and the memory hopper (M1) in this embodiment can be fed by either of adjacent weighing hoppers (S1) or (S2).

Detours are used where combinations are selected from weighing hoppers without the use of memory hoppers. The detour (N1), for example, is connected to either of weighing hoppers (S12) and (S1).

When odd-number hoppers are used in the weighing operation, combinations are selected from the group of one hopper per set of weighing and memory hoppers, i.e. (S2) and (M1), ... (S12) and (M6) see FIG. 5.

Figure 6:
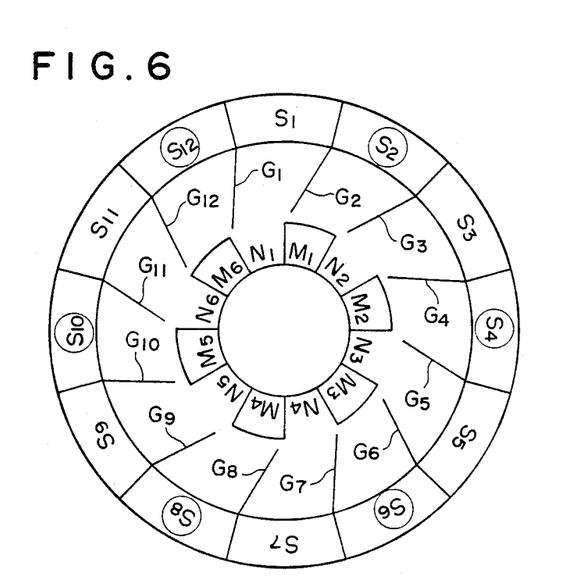
FIGS. 6 through 8, respectively, are explanatory views showing the mode of operation of the second embodiment shown in FIG. 5.

If even-number hoppers are used in the weighing operation, combinations are selected from the group of one hopper per set of weighing and memory hoppers, i.e. (S1) and (M1), (S3) and (M2)... (S11) and (M6).

Figure 7:
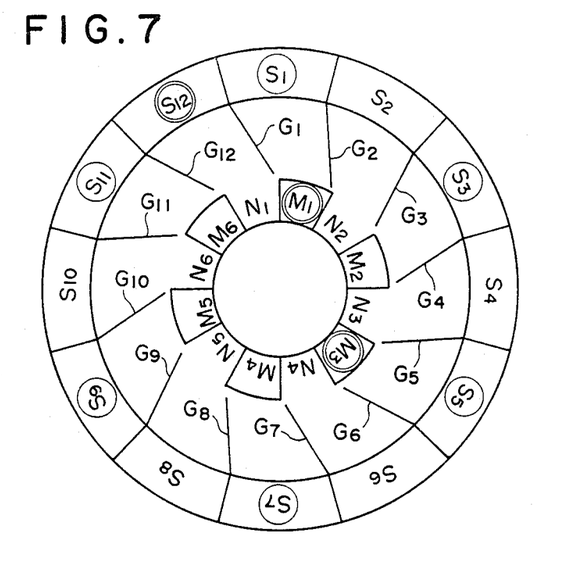
Figure 8:
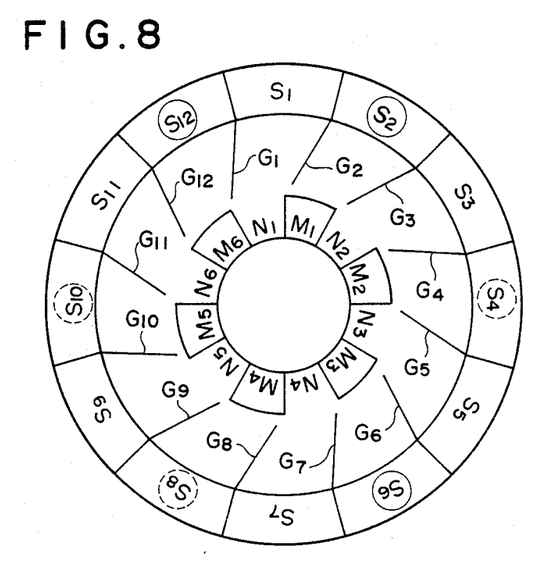

The combining operation of the second embodiment is explained with reference to FIGS. 7 and 8.

If combinations are selected from even number weighing hoppers and memory hoppers (M1)... (M6), and if the weighing hopper (S12) and memory hoppers (M1) (M3) are selected (FIG. 7), products of these hoppers are discharged and the hoppers become empty.

Then gates (G1)... (G12) are changed as shown in FIG. 8, so that new products to be measured are fed into the empty hopper (S12) and weighed products are transferred into empty memory hoppers (M1) (M3) from weighing hoppers (S2) (S6) which in turn, are then fed with new products.

Consequently the weighing hoppers (S2) (S6) (S12) are used in the weighing process while the weighing hoppers (S4) (S8) (S10), are pooled with weighed products.

In the next stage, combinations is selected from odd-number weighing hoppers and memory hoppers (M1)... (M6). The procedure above is repeated.

The combination accuracy of the second embodiment is identical to that of the first embodiment, in spite of the fact that the number of memory hoppers are smaller.

The third embodiment is explained with reference to FIGS. 9 through 12, wherein references (S1, S2), ... (S11, S12) are weighing hopper sets consisting of two hoppers per set. The weighing operation is alternated between hoppers in each set.

Below the weighing hoppers are provided memory hopper sets (M1, M2) ... (M11, M12) consisting of two hoppers per set. The weighing hopper can transfer weighed products to either of the paired memory hoppers. For example, the weighing hoppers (S1) (S2) feed products to either of memory hoppers (M1) (M2). Weighed products are pooled in the memory hoppers. The memory hoppers are so arranged that both of a paired set will not be combined at the same time, just as in the case of the first embodiment.

The mode of operation is explained referring to drawings in which encircled weighing hoppers are in the weighing process while encircled memory hoppers are empty.

Figure 9:
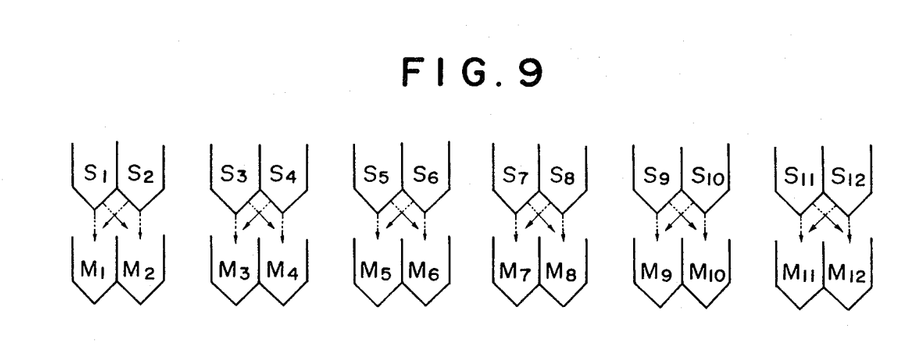
FIG. 9 is a structural view of the third embodiment of the invention.
Figure 10:
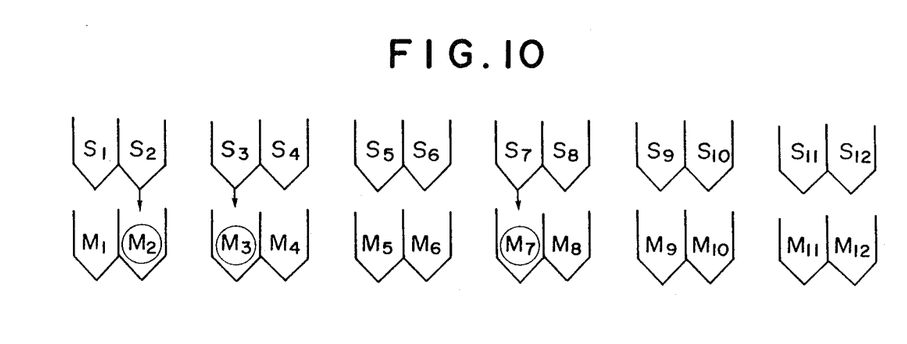
FIGS. 10 through 12, respectively, are explanatory views showing the mode of operation of the third embodiment shown in FIG. 9.

At the first stage, products to be weighed are fed into all weighing hoppers (S1) ... (S12) and after being weighed, they are transferred into corresponding memory hoppers (M1) ... (M2), while new products are fed into empty weighing hoppers (FIG. 9).

Figure 11:
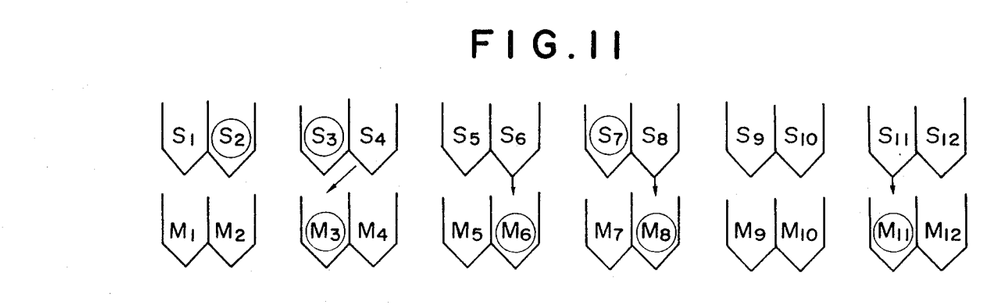

When memory hoppers (M2) (M3) (M7) are selected as a combination (FIG. 10), weighing hoppers (S2) (S3) (S7) supply these empty memory hoppers with products while being fed with new products (FIG. 11).

When the next combination of memory hoppers (M3) (M6) (M8) (M11) is selected, weighing hoppers (S6) supply memory hoppers (M6) (M8) (M11) with products, while a weighing hopper (S4) feeds the remaining memory hopper (S3) since weighing hopper (S3) is in the weighing process (FIG. 11).

Figure 12:
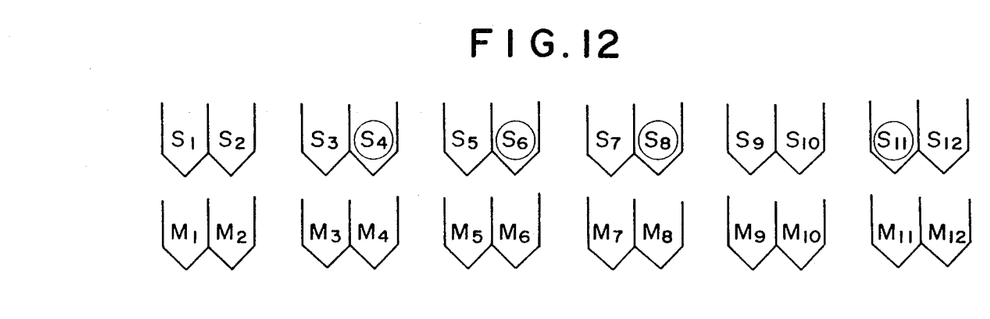

In the following combining process, the weighing process is completed for hoppers (S2) (S3) (S7) while the process is going on for hoppers (S4) (S6) (S8) (S11) (FIG. 12). The procedure above is repeated.

The combining accuracy in this third embodiment is similar to that of the first embodiment. The accuracy is superior to that of conventional apparatuses. Since empty memory hoppers are fed with weighed products without any waiting time, working efficiency is increased. Further, since combinations are carried out always with 12 memory hoppers, no reduction in combining accuracy is occurs.

The fourth embodiment is explained with reference to FIGS. 13 through 16, wherein sets of two weighing hoppers (S1) (S2) ... (S9) (S10) are circularly arranged similar to those of the third embodiment. 15 memory hoppers (M1) ... (M5) are arranged likewise in such a manner that some memory hoppers, i.e. (M1) (M2) (M4) (M5) (M7) (M8) (M10) (M11) (M13) (M14) are provided below weighing hoppers while other memory hoppers (M3) (M6) (M9) (M12) (M15) are provided in spaces between the weighing hoppers.

Further, guides (G1) ... (G15) are provided so that the weighing hoppers can transfer weighed products to any one of three memory hoppers at the position immediately below and to two sides of the respective weighing hopper. In the drawings, FIGS. 13, 14 and 15, respectively, illustrate the state where weighing hoppers transfer products to memory hoppers below, righthand and lefthand the respective weighing hoppers.

These guides are pivotally provided at both sides of weighing hopper outlets.

The weighing hoppers are so arranged that odd- and even-numbered hoppers are alternatingly operated. When odd-numbered hoppers are used in the weighing operation (FIG. 14), products are transferred from even-numbered hoppers to sets of three memory hoppers (M1, M2, M3) ... (M13 M14, M15), and when even numbered weighing hoppers are weighing, odd-numbered hoppers feed to different memory sets (M15, M1, M2) ... M12, M13, M14).

The combined weighing apparatus of this embodiment is operated as follows.

Figure 13:
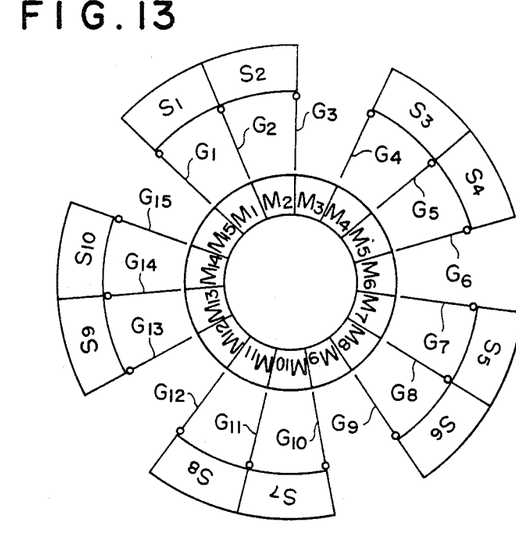
FIG. 13 is a structural view of the fourth embodiment of the invention.
Figure 14:
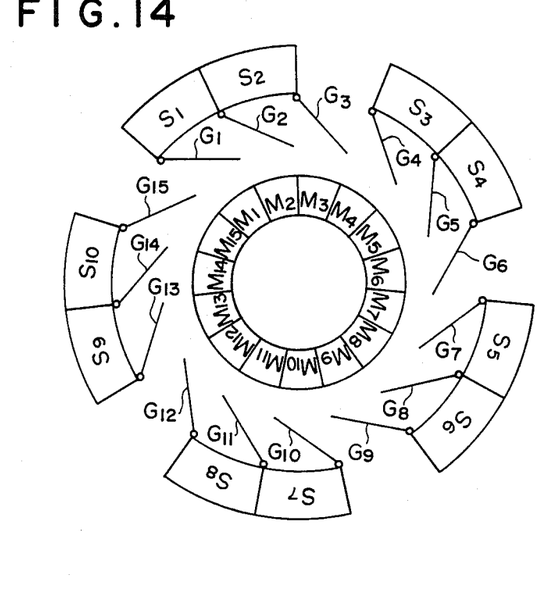
FIGS. 14 through 16, respectively, are explanatory views showing the mode of operation of the fourth embodiment shown in FIG. 13.

At the first stage, products are supplied to all weighing hoppers (S1) ... (S10) and, after being weighed, products are transferred into memory hoppers immediately therebelow, and new products are fed into emptied weighing hoppers (FIG. 13).

Figure 15:
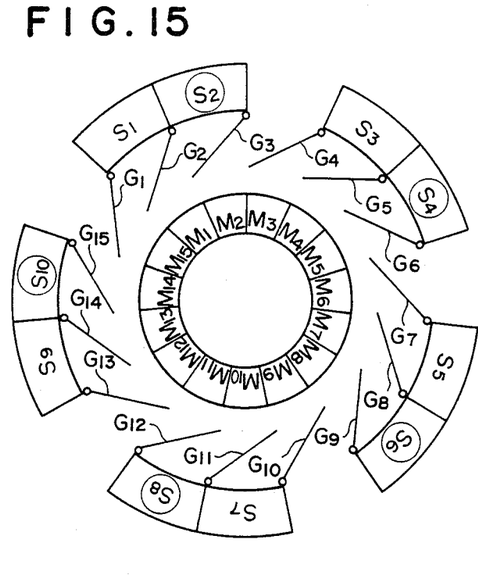

After being weighed, products in even-numbered weighing hoppers are transferred into still empty memory hoppers (M3) (M6) (M9) (M12) (M15) (FIG. 14), while odd-numbered weighing hoppers are pooled with weighed products (FIG. 15).

Figure 16:
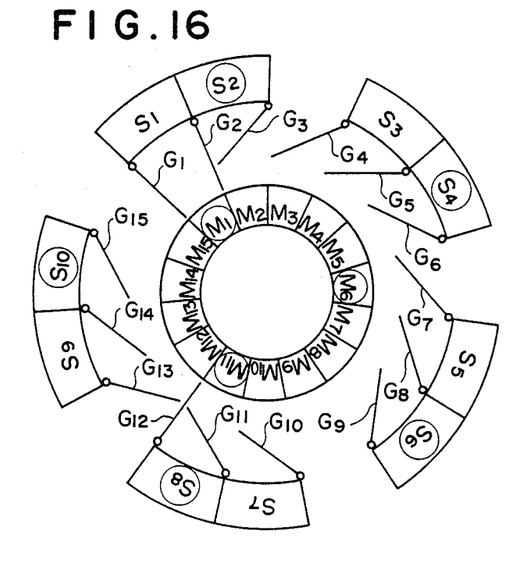

Even-numbered weighing hoppers are in the weighing process. A combination is selected from sets of memory hoppers (M15) (M1) (M2), ... (M12) (M13) (M14). When memory hoppers (M1) (M6) (M11) are selected and products therein are discharged, these empty hoppers are filled in with weighed products due to movement of guides (G1) ... (G15) (FIG. 16). The procedure above is repeated. The total number of combinations of this embodiment is as follows:

$$_5C_1 \times 3^1 + {_5C_2} \times 3^2 + {_5C_3} \times 3^3 + {_5C_4} \times 3^4 + {_5C_5} \times 3^5$$
$$= 15 + 90 + 270 + 405 + 243$$
$$= 1023$$

Thus, while the number of weighing hoppers and combining accuracy are the same as those of the prior art, the combining speed is remarkably increased.

While there have been described herein what are at present considered preferred embodiments of the several features of the invention, it will be obvious to those skilled in the art that modifications and changes may be made without departing from the essence of the invention.

What is claimed is:

1. A method of weighing products, comprising the steps of:
   providing six sets of two weighing hoppers;
   alternately weighing products with said two weighing hoppers of each set;
   providing a plurality of sets of three memory hoppers;
   each set of two weighing hoppers corresponding to a respective set of three memory hoppers;
   supplying weighed products from either of said weighing hoppers of a set to one memory hopper of each respective set;
   forming combinations of weights from a group of memory hoppers consisting of one hopper from each set;
   selecting a combination within a permissible limit of a predetermined weight and/or which is closest to said predetermined weight from said combinations; and immediately feeding selected memory hoppers used in the selected combination after being emptied, from odd- or even-numbered weighing hoppers which correspond to the selected memory hoppers.

2. A method of weighing products, comprising the steps of:
   providing a plurality of sets of weighing hoppers, each set including at least two weighing hoppers;
   providing a plurality of sets of memory hoppers, each set including at least two memory hoppers;
   each set of memory hoppers being different from any other set of memory hoppers;
   arranging each set of weighing hoppers so that only one weighing hopper of each set can discharge into only one memory hopper of a respective predetermined set, at a given time;
   grouping one memory hopper from different selected sets of said memory hoppers to form different combinations of weights; and
   selecting a combination within a permissible limit of a predetermined weight and/or which is closest to said predetermined weight from said combinations.

3. A method according to claim 2; further including the steps of providing a plurality of sets of two weighing hoppers for alternately weighing products fed thereto; arranging said sets of at least two memory hoppers to receive weighed products from either of said weighing hoppers from a corresponding set, for pooling weighed products; forming combinations of weights from the group of memory hoppers consisting of one hopper from each selected set; and feeding selected memory hoppers with weighed products immediately after being emptied, from one weighing hopper from the corresponding set which is not in the weighing operation.

4. A method according to claim 3; further including the steps of providing six sets of two weighing hoppers; and providing six sets of two memory hoppers.

5. A method of weighing products, comprising the steps of:
   providing a first odd-numbered set of a plurality of weighing hoppers;
   providing a second even-numbered set of a plurality of weighing hoppers, the number of weighing hoppers in said second set being equal to the number of weighing hoppers in said first set;
   arranging said first and second sets about a circle;
   arranging a plurality of memory hoppers spaced apart about a concentric circle and equal in number to the number of weighing hoppers in said first set;
   arranging each weighing hopper to discharge only into one predetermined memory hopper;
   selectively associating said memory hoppers with respective weighing hoppers of only one of said first and second sets;
   selectively grouping at least one of:
   (a) at least one memory hopper, and
   (b) at least one weighing hopper from one of said sets
   to form different combinations of weights; and
   selecting a combination within a permissible limit of a predetermined weight and/or which is closest to said predetermined weight from said combinations.

6. A method according to claim 5; further including the step of providing six weighing hoppers in said first odd-numbered set, providing six weighing hoppers in said second even-numbered set and providing six memory hoppers.

7. A method of weighing products, comprising the steps of:
   providing a first odd-numbered set of a plurality of weighing hoppers;
   providing a second even-numbered set of a plurality of weighing hoppers, the number of weighing hoppers in said second set equal to the number of weighing hoppers in said first set;
   arranging said first and second sets about a circle;
   arranging a plurality of memory hoppers spaced apart about a concentric circle and equal in number to the number of weighing hoppers in said first set;
   arranging a plurality of detours spaced about said concentric circle interleaved with said memory hoppers;
   arranging each weighing hopper to discharge only into one of a predetermined detour and memory hopper;
   selectively associating each weighing hopper with a selected one of the respective detour and memory hopper;
   selectively grouping at least one of said weighing hoppers from one of said sets to form different combinations of weights; and
   selecting a combination within a permissible limit of a predetermined weight and/or which is closest to said predetermined weight from said combinations.

8. A method according to claim 7; further including the steps of:
   providing six weighing hoppers in said first odd-numbered set;
   providing six weighing hoppers in said second even-numbered set;
   providing six memory hoppers spaced about said concentric circle;
   providing six detours spaced about said concentric circle;
   forming said weight combinations from said set of even-numbered weighing hoppers and from said memory hoppers when odd-numbered weighing hoppers are in a weighing operation; and
   forming said weight combinations from said set of odd-numbered weighing hoppers and from said memory hoppers when even-numbered weighing hoppers are in a weighing operation.

9. A method of weighing products, comprising the steps of:
   providing a plurality of sets of weighing hoppers with said sets being spaced apart about a circle;
   arranging a plurality of memory hoppers spaced about a concentric circle;
   arranging each weighing hopper to discharge only into three predetermined memory hoppers;
   associating each weighing hopper with only one of the respective three predetermined memory hoppers;
   grouping one memory hopper from different selected sets of three memory hoppers to form different combinations of weights; and
   selecting a combination within a permissible limit of a predetermined weight and/or which is closest to a predetermined weight from said combinations.

10. A method according to claim 9; further including the steps of:
   providing n sets of odd- and even-numbered weighing hoppers circularly in a manner that odd- and even-numbered weighing hoppers alternately weigh products; and providing the number of memory hoppers equal to that of the weighing hoppers plus n, circularly below said weighing hoppers.

11. A method according to claim 10; further including the steps of:
providing 5 sets of two weighing hoppers;
providing 15 memory hoppers;
grouping first sets of three memory hoppers to form said combinations when odd-numbered weighing hoppers are in a weighing operation; and
grouping different sets of three memory hoppers to form said combinations when even-numbered hoppers are in a weighing operation.

* * * * *